US008376287B2

(12) United States Patent
Zhang

(10) Patent No.: US 8,376,287 B2
(45) Date of Patent: Feb. 19, 2013

(54) LAYING HEAD PIPE CLAMP

(75) Inventor: Jianping Zhang, Newton, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 491 days.

(21) Appl. No.: 12/644,154

(22) Filed: Dec. 22, 2009

(65) Prior Publication Data

US 2011/0148109 A1   Jun. 23, 2011

(51) Int. Cl.
*F16L 5/00* (2006.01)

(52) U.S. Cl. ............... 248/56; 248/69; 248/62; 248/73; 403/235; 403/236

(58) Field of Classification Search .............. 248/56, 248/69, 74.1, 62, 61, 65, 71, 72, 73, 74.2; 411/349, 549, 553; 403/235, 236, 290, 348, 403/398, 399
See application file for complete search history.

(56) References Cited

U.S. PATENT DOCUMENTS

| | | | | |
|---|---|---|---|---|
| 2,620,539 | A * | 12/1952 | Poupitch | 411/349 |
| 3,407,454 | A * | 10/1968 | Myatt | 411/549 |
| 3,427,552 | A * | 2/1969 | Sauer et al. | 439/332 |
| 3,504,875 | A * | 4/1970 | Gley et al. | 248/27.3 |
| 4,129,395 | A * | 12/1978 | Theurer et al. | 403/317 |
| 4,497,190 | A * | 2/1985 | Woodrow | 72/133 |
| 5,423,646 | A * | 6/1995 | Gagnon | 411/184 |
| 6,376,777 | B1 * | 4/2002 | Ito et al. | 174/152 G |
| 6,715,720 | B2 * | 4/2004 | Finn | 248/71 |
| 6,837,645 | B2 * | 1/2005 | Kanatani et al. | 403/348 |
| 7,049,515 | B1 * | 5/2006 | Collins et al. | 174/668 |
| 7,422,181 | B2 * | 9/2008 | Suβenbach | 248/56 |

FOREIGN PATENT DOCUMENTS

| | | |
|---|---|---|
| DE | 226209 A1 | 8/1985 |
| DE | 102007029811 B3 | 7/2008 |
| JP | 2002126817 A | 5/2002 |

OTHER PUBLICATIONS

PCT International Search Report dated Mar. 2, 2011 corresponding to PCT Patent Application No. PCT/US2010/058645 filed Dec. 2, 2010 (11 pages).

* cited by examiner

*Primary Examiner* — Nkeisha Smith

(57) ABSTRACT

A clamp assembly is disclosed for detachably retaining a curved laying pipe along the correspondingly curved edge of an auger support plate in a rolling mill laying head. The clamp assembly comprises a boss fixed to and projecting from the curved edge of the support plate. The boss has a first opening extending therethrough and an exterior support surface. A generally U-shaped clamp has a bridging web joining mutually spaced cheeks with second openings extending therethrough. The cheeks are configured and arranged to straddle the boss with their second openings in alignment with the first opening in the boss, and with the bridging web coacting with the exterior support surface of the boss to confine a segment of the laying pipe therebetween. A pin extends in an inserted position through the aligned first and second openings in the boss and the cheeks.

7 Claims, 4 Drawing Sheets

LAYING HEAD PIPE CLAMP

BACKGROUND DISCUSSION

1. Field of the Invention

This invention relates to laying heads of the type used in rolling mills to form hot rolled rods and other like products into rings.

2. Description of the Prior Art

In a rolling mill laying head, a hot rolled rod is directed through a three dimensionally curved laying pipe removably held on the edge of an auger shaped support plate by a series of clamps. The support plate forms part of a pipe support that is rotated at high speeds to thereby form the rod exiting from the laying pipe into a continuous series of rings.

The clamps are typically held in place by pins which in turn are secured by retaining bolts. During mill operation, the hot rolled rod travels through the laying pipe at high speeds and is forced to follow the curvature of the pipe, resulting in frictional wear of the pipe interior. When wear becomes severe, which occurs at intervals dictated by the rod material, temperature and speed, the laying pipe must be changed. When making a pipe change, all clamps must first be removed before the worn laying pipe can be replaced with a new pipe, and the clamps must then be reinstalled once the replacement pipe is in place. This necessitates removal and replacement of the retaining bolts, a labor intensive and time consuming procedure, resulting in protracted mill downtime that adversely affects production and mill efficiency.

There exists a need, therefore, for an improved clamp assembly that not only securely retains the laying pipe in place, but that also can be more easily and rapidly removed and reinstalled when changing laying pipes.

SUMMARY OF THE INVENTION

A clamp assembly in accordance with the present invention comprises a boss fixed to and projecting from the edge of the auger shaped support plate of the laying head. The boss has a first opening extending therethrough, and an exterior support surface. A generally U-shaped clamp has a bridging web joining mutually spaced legs with second openings extending therethrough. The legs are configured and arranged to straddle the boss, with the second openings in the legs aligned with the first opening in the boss, and with the bridging web coacting with the exterior support surface on the boss to define a space within which a segment of the laying pipe is confined. A pin is releasably retained in an inserted position extending through the aligned first opening in the boss and the second openings in the clamp legs.

These and other features and attendant advantages of the present invention will now be described in further detail with reference to the accompanying drawings, wherein:

DETAILED DESCRIPTION

Figure 1:
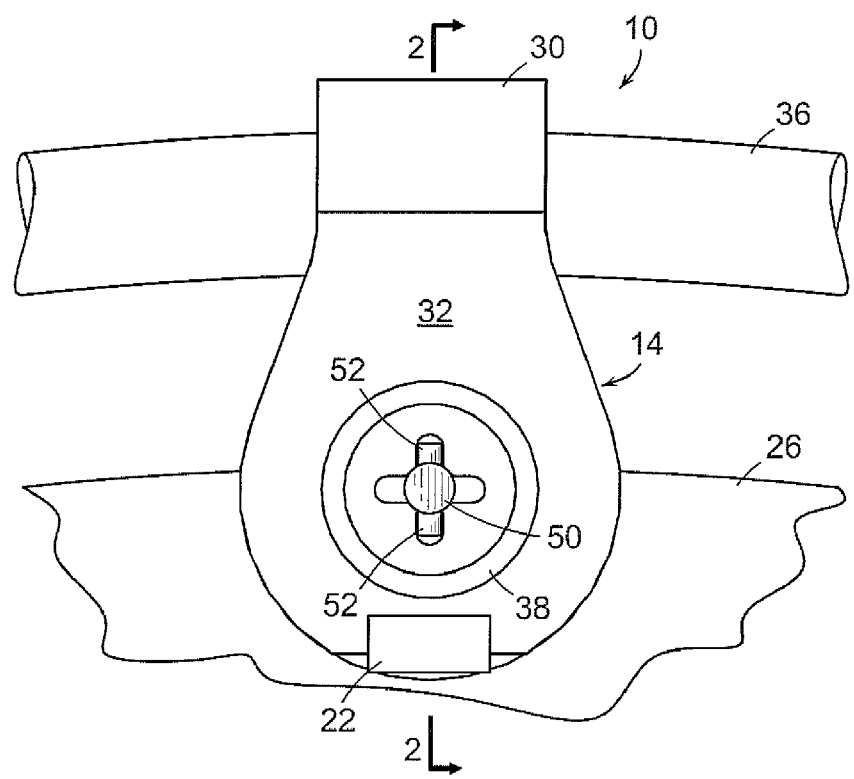
FIG. 1 is a side view showing a clamp in accordance with the present invention retaining a segment of the laying pipe on the auger plate of a laying head pipe support.
Figure 2:
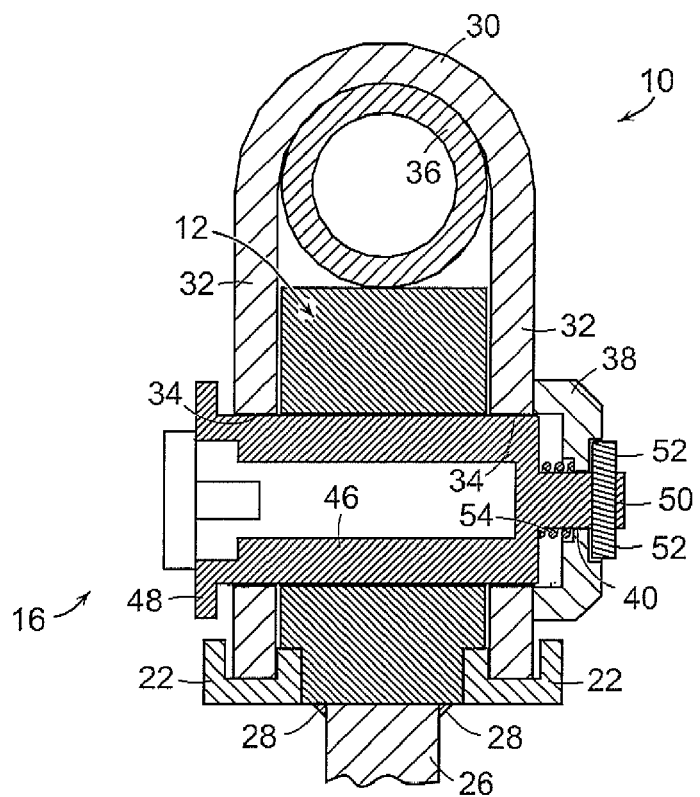
FIG. 2 is a sectional view taken on line 2-2 of FIG. 1.
Figure 3:
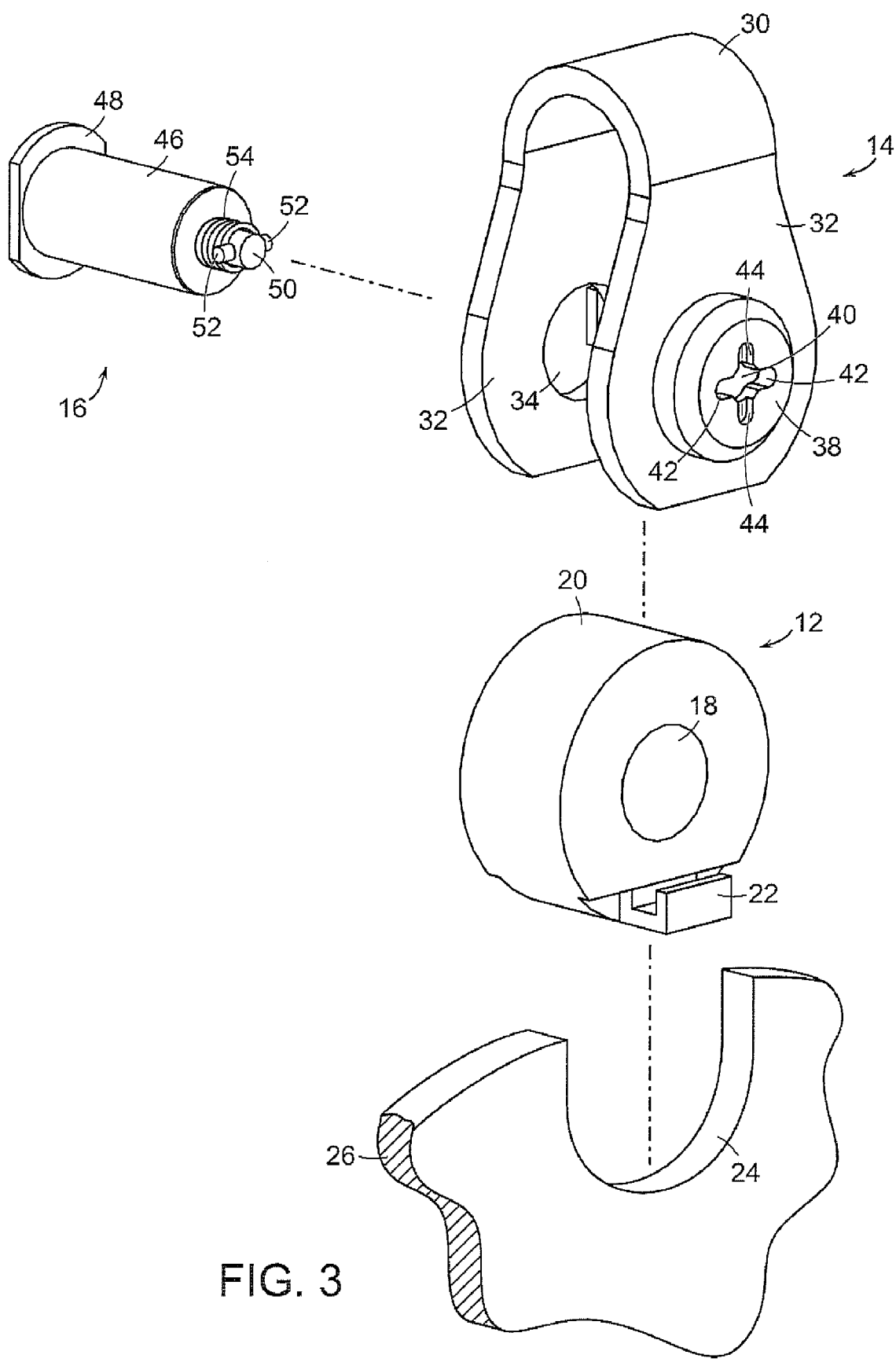
FIG. 3 is an exploded view of the clamp components.

With reference initially to FIGS. 1-3, a clamp assembly in accordance with the present invention is generally depicted at 10. The clamp assembly comprises a boss 12, a generally U-shaped clamp 14 and a retaining pin 16.

The boss 12 has a first through opening 18 and an exterior curved support surface 20. Channel shaped pockets 22 are arranged on opposite sides of the boss. The boss is seated in a correspondingly shaped notch 24 in the curved edge of a pipe support's auger shaped support plate 26, and is welded in place on opposite sides as at 28.

The clamp 14 has a bridging web 30 joining mutually spaced cheeks 32 having second openings 34 extending therethrough. The cheeks are configured and arranged to straddle the boss 12 with the second openings 34 aligned with the first opening 18 in the boss, with the bridging web 30 coacting with the exterior curved support surface 20 of the boss to confine a segment 36 of the laying head's curved laying pipe, and with the bottom ends of the cheeks received in the channel shaped pockets 22.

A collar 38 is provided on the exterior side of one of the cheeks 32. The collar has a third opening 40 aligned with the first opening 18. Slots 42 project radially from opening 40, as do shallow notches 44 arranged at 90° with respect to the slots.

The pin 16 has a cylindrical barrel 46 leading from a flanged end 48 to a reduced diameter stem 50 penetrated by a lock pin having radially protruding ends 52. A compression spring 54 is received on the stem 50 and held between the barrel 46 and the ends 52 of the lock pin.

Figure 4A:
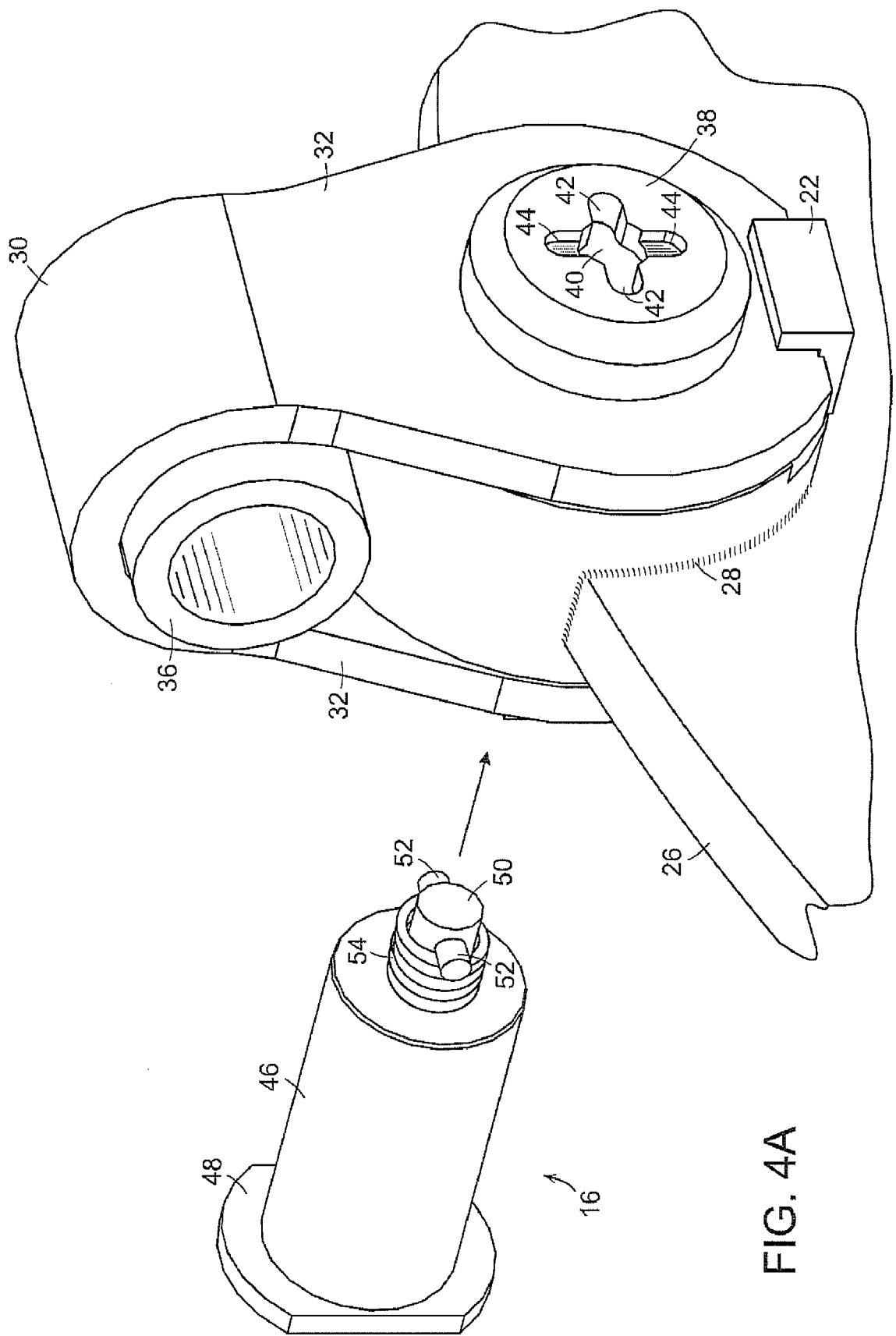
FIGS. 4A-4C are perspective views showing successive stages in the insertion and interlocked engagement of the retaining pin.
Figure 4B:
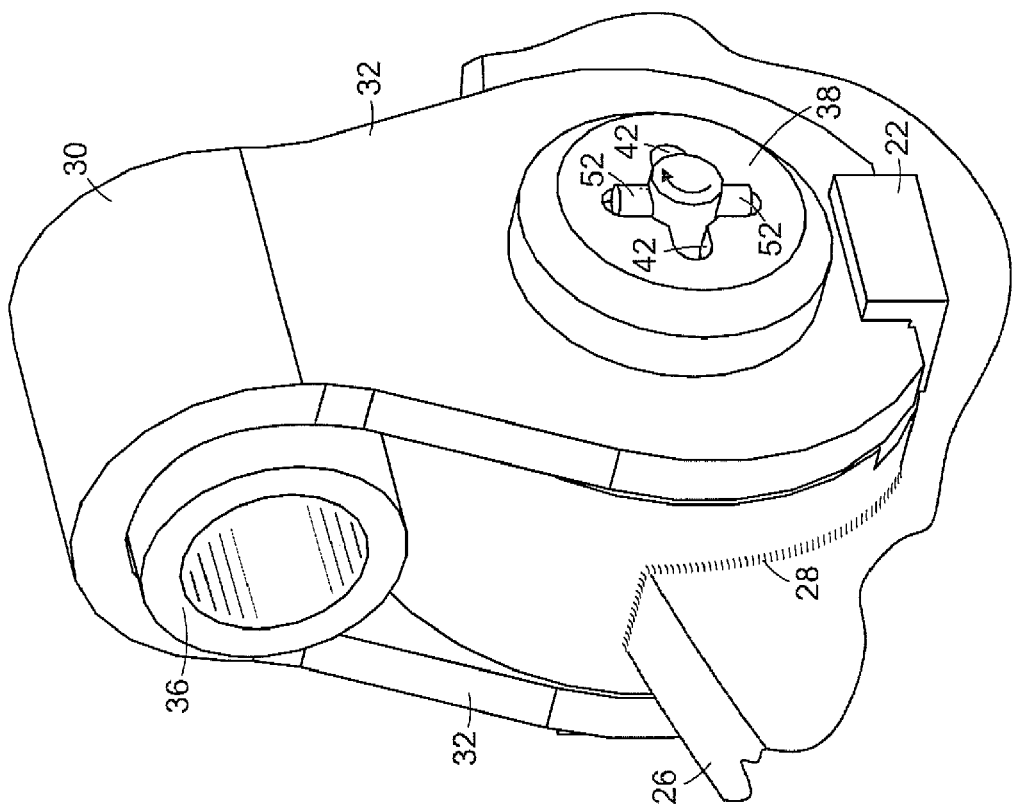
Figure 4C:
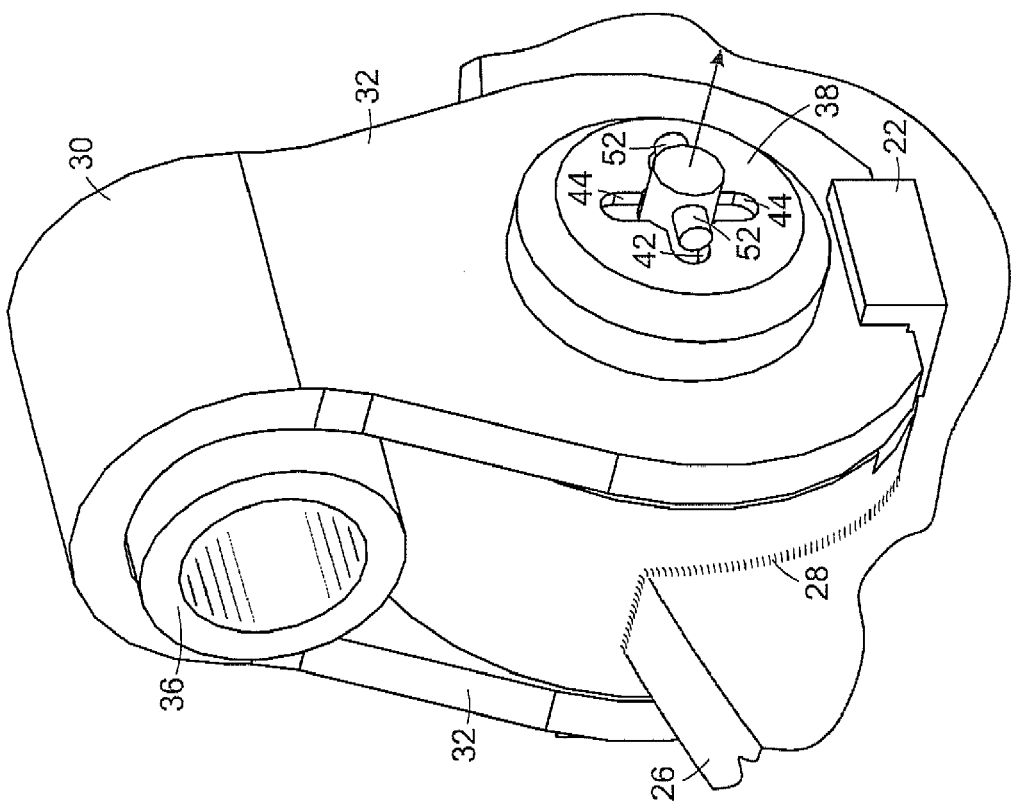

The clamp 14 is held on the boss 12 by inserting the pin 16 through the aligned apertures 18, 34, with the stem 50 projecting through the third opening 40, as shown in FIG. 4B. At this stage, the ends 52 of the lock pin have passed through the slots 42, and the spring 54 is compressed between the barrel 46 and the interior surface of the collar 38. The pin 16 may then be rotated through 90° and allowed to withdraw under the force of spring 54, thus seating the ends 52 of the lock pin in the notches 44, thereby mechanically securing the pin 16 against reverse rotation.

Extraction of the pin 16 is easily achieved by simply reversing the above described procedure.

Thus, it will now be appreciated by those skilled in the art that the clamp assembly of the present invention can be readily assembled and disassembled by the insertion and retraction of a single retaining pin, without the need to resort to additional threaded bolts or the like to ensure that the pin remains in place during high speed operation of the laying head.

The foregoing description has been set forth to illustrate the invention and is not intended to be limiting. Since further modifications of the described embodiments incorporating the spirit and substance of the invention may occur to persons skilled in the art, the scope of invention should be limited solely with reference to the appended claims and equivalents thereof.

What is claimed is:

1. A clamp assembly for detachably retaining a curved laying pipe along a correspondingly curved edge of an auger shaped support plate in a rolling mill laying head, said clamp assembly comprising:

a boss adapted to be fixed to and to project from the curved edge of said support plate, said boss having a first opening extending therethrough and an exterior support surface;

channel shaped pockets on opposite sides of said boss;

a generally U-shaped clamp having a bridging web joining mutually spaced cheeks, said cheeks having second openings extending therethrough, said cheeks being configured and arranged to straddle said boss, with bottom ends of said cheeks received and laterally confined within said pockets, with the second openings in said cheeks in alignment with the first opening in said boss, and with said bridging web coacting with the exterior support surface of said boss to confine a segment of the laying pipe therebetween; and a pin extending in an inserted position through the aligned first and second openings in said boss and said cheeks.

2. The clamp assembly of claim 1 further comprising interlocking means for releasably retaining said pin in said inserted position.

3. The clamp assembly of claim 2 wherein said pin comprises a cylindrical barrel received in said first and second openings, and wherein said interlocking means comprises a collar on an exterior of one of said cheeks, and a reduced diameter stem projecting axially from the cylindrical barrel of said pin into interlocked engagement with said collar.

4. The clamp assembly of claim 3 comprising radially protruding ends of a lock pin on said stem, a third opening in said collar aligned with the second openings in said cheeks, radial slots communicating with said third opening, and shallow notches communicating with said third opening and arranged at 90° with respect to said slots, said third opening and said slots being configured to accommodate passage therethrough of said stem and the radially protruding ends of said lock pin, followed by rotation of said pin to manipulate said radially projecting ends into or out of positions seated in said notches.

5. The clamp assembly of claim 4 further comprising means for resiliently retaining said radially protruding ends in seated positions in said notches.

6. The clamp assembly of claim 1 further comprising means for resiliently and releasably retaining said pin in said interlocked engagement with said collar.

7. A clamp assembly for detachably retaining a curved laying pipe along a correspondingly curved edge of an auger shaped support plate in a rolling mill laying head, said clamp assembly comprising:

a boss adapted to be fixed to and to project from the curved edge of said support plate, said boss having a first opening extending therethrough and an exterior support surface;

a generally U-shaped clamp having a bridging web joining mutually spaced cheeks, said cheeks having second openings extending therethrough, said cheeks being configured and arranged to straddle said boss with the second openings in said cheeks in alignment with the first opening in said boss, and with said bridging web coacting with the exterior support surface of said boss to confine a segment of the laying pipe therebetween;

a pin having a cylindrical barrel extending in an inserted position through the aligned first and second openings in said boss and said cheeks, and having a reduced diameter stem projecting axially from said barrel through a third opening in a collar on an exterior side of one of said cheeks, said stem having a lock pin with radially projecting ends, said collar having radial slots communicating with said third opening and shallow notches communicating with said third opening and arranged at 90° with respect to said slots, said third opening and said slots being configured to accommodate passage therethrough of said stem and the radially protruding ends of said lock pin, followed by rotation of said pin to manipulate said radially projecting ends into or out of positions seated in said notches; and means for resiliently retaining said radially protruding ends in seated positions in said notches.

\* \* \* \* \*